(12) United States Patent
Yoshimura (10) Patent No.: US 11,383,834 B2
(45) Date of Patent: Jul. 12, 2022

(54) UNMANNED FLYING OBJECT AND METHOD OF CONTROLLING UNMANNED FLYING OBJECT

(71) Applicant: Sony Interactive Entertainment Inc., Tokyo (JP)

(72) Inventor: Masanobu Yoshimura, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 316 days.

(21) Appl. No.: 16/316,196

(22) PCT Filed: Jul. 29, 2016

(86) PCT No.: PCT/JP2016/072386
§ 371 (c)(1),
(2) Date: Jan. 8, 2019

(87) PCT Pub. No.: WO2018/020671
PCT Pub. Date: Feb. 1, 2018

(65) Prior Publication Data
US 2019/0367166 A1    Dec. 5, 2019

(51) Int. Cl.
*B64C 39/02*     (2006.01)
*G05D 1/08*      (2006.01)
*G06F 3/041*     (2006.01)

(52) U.S. Cl.
CPC ......... *B64C 39/024* (2013.01); *G05D 1/0808* (2013.01); *G06F 3/041* (2013.01);
(Continued)

(58) Field of Classification Search
CPC ............ B64C 39/024; B64C 2201/027; B64C 2201/042; B64C 2201/141; G05D 1/0808; G06F 3/041
See application file for complete search history.

(56) References Cited

U.S. PATENT DOCUMENTS 9,671,787 B2   6/2017  Foinet
9,696,725 B2   7/2017  Wang
(Continued)

FOREIGN PATENT DOCUMENTS

CN    102785780 A   11/2012
CN    104685436 A    6/2015
(Continued)

OTHER PUBLICATIONS

Machine translation of CN 105739533 A (Year: 2016).*
(Continued)

*Primary Examiner* — Jeff A Burke
*Assistant Examiner* — Joshua Alexander Garza
(74) *Attorney, Agent, or Firm* — Matthew B. Dernier, Esq.

(57) ABSTRACT

Detectors detect a user's touch operation to an airframe, and a motor control unit controls rotations of motors, based on the user's touch operation detected by the detectors. The motor control unit is configured to have a hovering function of making the airframe automatically perform a stationary flight at a hovering position. The motor control unit keeps the setting of the hovering function off during a period while the detectors are detecting a user's touch operation, and when the detectors stop detecting a user's touch operation, the motor control unit sets the hovering function on.

9 Claims, 4 Drawing Sheets

(52) U.S. Cl.
CPC .. *B64C 2201/027* (2013.01); *B64C 2201/042* (2013.01); *B64C 2201/141* (2013.01)

(56) References Cited

U.S. PATENT DOCUMENTS

| | | | |
|---|---|---|---|
| 9,783,286 B1* | 10/2017 | Yang | B64C 39/024 |
| 9,802,691 B2 | 10/2017 | Nakamura | |
| 9,836,055 B1* | 12/2017 | Kim | G06F 3/017 |
| 10,104,297 B2 | 10/2018 | Sabe | |
| 10,168,601 B2 | 1/2019 | Waibel | |
| 2011/0049290 A1 | 3/2011 | Seydoux | |
| 2014/0099853 A1 | 4/2014 | Condon | |
| 2014/0313332 A1 | 10/2014 | Sabe | |
| 2015/0002391 A1* | 1/2015 | Chen | H04N 5/23293 |
| | | | 345/156 |
| 2015/0212391 A1 | 7/2015 | Waibel | |
| 2015/0286216 A1 | 10/2015 | Miwa | |
| 2016/0062364 A1 | 3/2016 | Foinet | |
| 2016/0101856 A1 | 4/2016 | Kohstall | |
| 2016/0179096 A1 | 6/2016 | Bradlow | |
| 2016/0313742 A1 | 10/2016 | Wang | |
| 2016/0376004 A1* | 12/2016 | Claridge | B64C 19/00 |
| | | | 701/3 |
| 2017/0137104 A1 | 5/2017 | Nakamura | |
| 2017/0144078 A1* | 5/2017 | Yamada | A63H 33/18 |
| 2017/0176992 A1 | 6/2017 | Wang | |
| 2017/0185084 A1* | 6/2017 | Wang | G05D 1/0088 |
| 2017/0371410 A1* | 12/2017 | Boss | A63F 13/211 |
| 2018/0259953 A1* | 9/2018 | Park | G06K 9/00375 |
| 2020/0108914 A1* | 4/2020 | Yoo | G05D 1/0033 |

FOREIGN PATENT DOCUMENTS

| | | | |
|---|---|---|---|
| CN | 104755373 A | | 7/2015 |
| CN | 105116909 A | | 12/2015 |
| CN | 105739533 A | * | 7/2016 |
| CN | 205396523 U | | 7/2016 |
| EP | 3398021 A1 | | 11/2018 |
| JP | 2011511736 A | | 4/2011 |
| JP | 2014212479 A | | 11/2014 |
| JP | 2015531718 A | | 11/2015 |
| JP | 5875093 B1 | | 3/2016 |
| JP | 2016043927 A | | 4/2016 |
| WO | 2015085598 A1 | | 6/2015 |
| WO | 2017115120 A1 | | 7/2017 |

OTHER PUBLICATIONS

International Search Report for corresponding PCT Application No. PCT/JP2016/072386, 4 pages, dated Aug. 23, 2016.
Specs for Snap 4K flying camera, Vantage Robotics [online], Internet:<URL: https://vantagerobotics.com/snap/specs> 6 pages, Jan. 2015 [retrieval date Aug. 12, 2016].
International Preliminary Report on Patentability and Written Opinion for corresponding PCT Application No. PCT/JP2016/072386, 12 pages, dated Nov. 29, 2018.
Extended European Search Report for corresponding EP Application No. 16910574.9, 10 pages, dated Feb. 17, 2020.
Office Action for corresponding CN Application No. 201680087875.7, 7 pages, dated Sep. 3, 2021.

* cited by examiner

UNMANNED FLYING OBJECT AND METHOD OF CONTROLLING UNMANNED FLYING OBJECT

TECHNICAL FIELD

The present invention relates to an unmanned flying object, and particularly relates to an unmanned flying object that has a hovering function, and a method of controlling a flight.

BACKGROUND ART

A multicopter as an unmanned flying object is popular. The multicopter includes a plurality of rotary wings, and is installed with a hovering function of automatically performing a stationary flight at a hovering position.

PTL 1 discloses a technique of acquiring a height and a horizontal velocity of a rotary-wing drone that is performing a hovering flight, servo controlling a vertical propulsion force in order to stabilize the acquired height, servo controlling a horizontal propulsion force in order to obtain a zero horizontal velocity, and automatically stabilizing an airframe. According to PTL 1, the rotary-wing drone acquires the horizontal velocity from a plurality of video images captured with a camera that faces the front of the airframe.

PTL 2 discloses a technique of providing a position sensor that detects a current position of a global positioning system (GPS) or the like in a floating flying object, and real-time controlling left and right positions of horizontal propulsion propellers so as to cancel a quantity of deviation from a hovering position so that even when the floating flying object is deviated from a hovering position by strong wind, the floating flying object is immediately returned to the original position.

CITATION LIST

Patent Literature

[PTL 1] JP-T-2011-511736 [PTL 2] Japanese Patent No. 5875093

SUMMARY

Technical Problem

An unmanned flying object is operated with a remote controller (hereinafter, also referred to as a "remocon") called a "proportional controller (propo)." A remote controller has so far been used as a main exclusive transmitter. However, recently, there has come to be used an application type remote controller that operates an unmanned flying object on the screen of a smartphone by displaying a video from a first-person viewpoint called first person view (FPV).

Each type of remote controller transmits a user's operation signal by radio to an unmanned flying object, and the unmanned flying object flies in accordance with a received operation signal. In order to accurately move the unmanned flying object to a desired position, a fine remote control operation is required, and this is a difficult operation for a beginner. Therefore, the present inventor has developed a technique for enabling a user to easily move the unmanned flying object.

The present invention has been made to solve the above problem, and an object of the present invention is to provide a technique for easily moving an unmanned flying object.

Solution to Problem

In order to solve the above problem, a certain mode of the present invention relates to an unmanned flying object that has a plurality of rotors. The unmanned flying object includes electric motors configured to drive the rotors, an operation signal acquiring unit configured to acquire an operation signal, a controller configured to control rotations of the electric motors, based on the operation signal acquired by the operation signal acquiring unit, and detectors configured to detect a user's touch operation to an airframe. The controller controls the rotations of the electric motors, based on the user's touch operation detected by the detectors.

Another mode of the present invention relates to a method of controlling the flight of an unmanned flying object that has a plurality of rotors. This method includes a step of acquiring an operation signal, a step of controlling rotations of electric motors that drive rotors, based on the acquired operation signal, and a step of detecting a user's touch operation to an airframe. The step of controlling the rotations of the electric motors is for controlling the rotations of the electric motors, based on the detected user's touch operation.

Further, an optional combination of the above configuration elements, and the expression of the present invention that is converted between methods, devices, systems, computer programs, recording mediums in which computer programs are readably recorded, and data structures, are also valid as modes of the present invention.

DESCRIPTION OF EMBODIMENT

Figure 1:
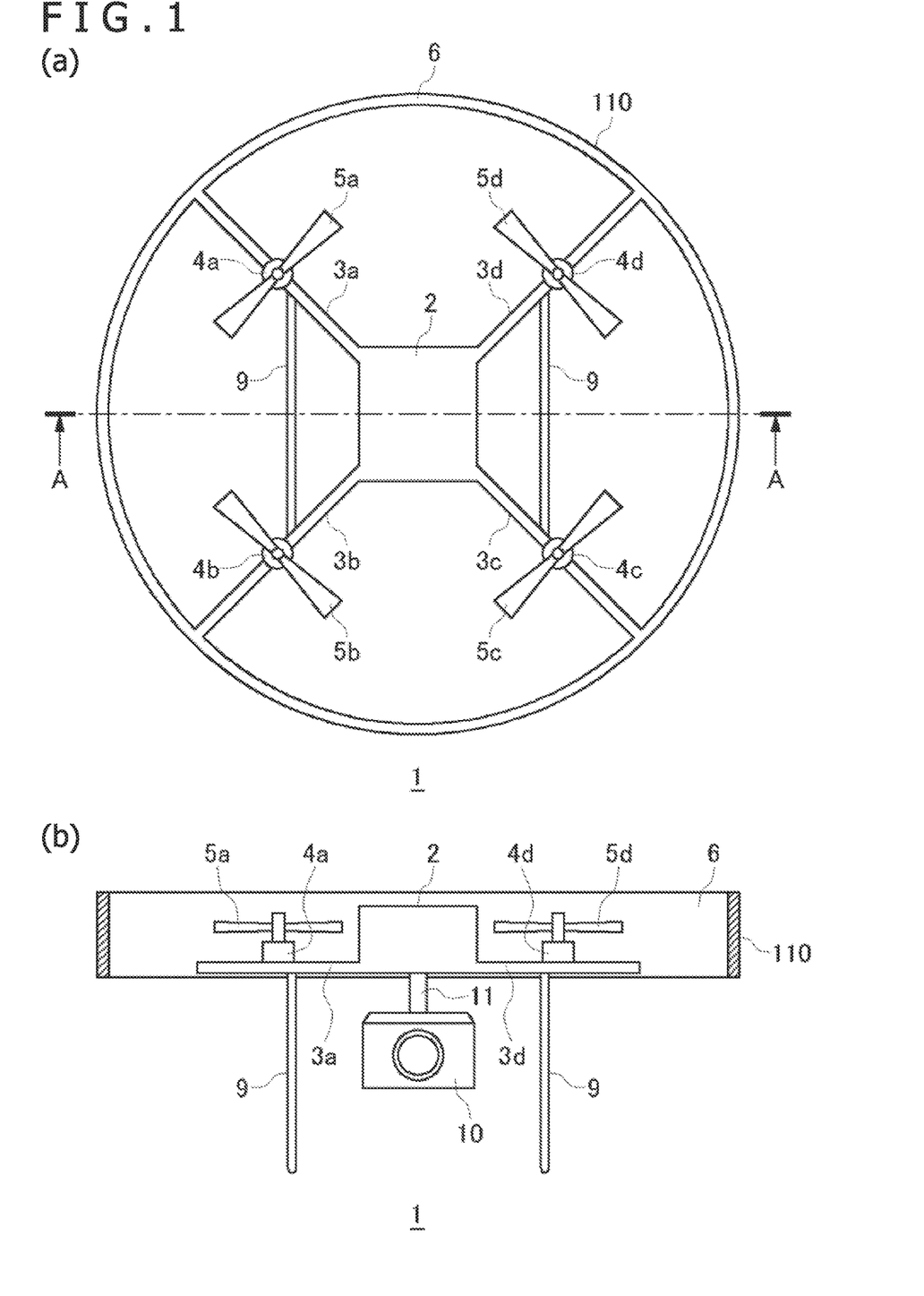
FIG. 1(a) is a plan view of an unmanned flying object.
FIG. 1(b) is a side view of the unmanned flying object.

FIG. 1(a) is a plan view of an unmanned flying object 1 according to an embodiment. The unmanned flying object 1 is a multicopter having a plurality of rotors (propellers), and a flight of the unmanned flying object 1 is operated by remote control. The unmanned flying object 1 is a quadcopter that has for rotors. Alternatively, the unmanned flying object 1 may be a hexacopter that has six rotors, an octocopter that has eight rotors, or may be other multicopter that has other number of rotors. The unmanned flying object 1 has a hovering function of automatically performing a stationary flight in the air.

The unmanned flying object 1 has a housing 2 on which a controller and various sensors are mounted. From the housing 2, there are provided to radially extend in a horizontal direction, a first arm 3a, a second arm 3b, a third arm 3c, and a fourth arm 3d (hereinafter, also referred to as an "arm 3" when not specifically distinguished). An external end part of each arm 3 is linked to an airframe contour 6 that forms an outer periphery of the unmanned flying object 1. A rotor and an electric motor that drives the rotor are provided at approximately a center position of each arm 3. The airframe contour 6 is a ring-shaped member surrounding the housing 2, and is configured to have a circular cross surface.

In the embodiment, a first motor 4a is provided on the first arm 3a, and the first motor 4a drives a first rotor 5a. A second motor 4b is provided on the second arm 3b, and the second motor 4b drives a second rotor 5b. A third motor 4c is provided on the third arm 3c, and the third motor 4c drives a third rotor 5c. A fourth motor 4d is provided on the fourth arm 3d, and the fourth motor 4d drives a fourth rotor 5d. Hereinafter, when each motor is not distinguished, the motors will be also collectively referred to as "motors 4," and when each rotor is not distinguished, the rotors will be also collectively referred to as "rotors 5."

FIG. 1(b) illustrates a side view of a partially cross section of the unmanned flying object 1. FIG. 1(b) illustrates an overview of a state that the inner side of the airframe contour 6 is cut along a line A-A of FIG. 1(a). On the airframe, a pair of legs 9 are provided. A camera 10 and a gimbal 11 are provided between the pair of legs 9. The gimbal 11 is a device that stabilizes a posture of the camera 10, and the camera 10 is fixed to the airframe via the gimbal 11.

The gimbal 11 sets an angle of elevation of the camera 10, in accordance with an instruction from a user. The angle of elevation of the camera 10 is set within a movable range of the angle of elevation, that is 30° in an upper direction and −90° in a lower direction, based on a horizontal direction as a reference (0°). The user operates the dial for changing the angle of elevation of the camera (gimbal dial) provided on the remote controller to set the tilt of the camera 10 within the movable range of the angle of elevation. When performing photographing in the front direction of the airframe, the user sets 0° as the angle of elevation of the camera 10, and when performing photographing in the lower direction of the airframe, the user sets −90° as the angle of elevation of the camera 10.

The unmanned flying object 1 according to the embodiment is mounted with a system that enables the user to operate the airframe that is hovering, by touching with the hand. During the hovering, the rotors 5 are rotating. Therefore, it is preferable that the airframe is configured to avoid the user's hand from being taken by the rotating rotors 5 when the user touches the airframe. Accordingly, in the side view, the airframe contour 6 is disposed outside a rotation region of the rotors 5 in the radial direction, and has a height in which the rotors 5 are accommodated within an inner space of the airframe contour 6. That is, in the side view, the rotors 5 are set between an upper edge and a lower edge of the airframe contour 6. This shape of the airframe contour 6 reduces a possibility that the hand touches the rotors 5, when the user touches the hovering airframe from the side.

In order to entirely prevent a touch between the hand and the rotors 5, an opened upper surface and an opened lower surface of the airframe contour 6 may be blocked with a guard member that does not substantially hinder the lifting force generated by the rotors 5. The guard member is configured as a plane member having holes or slits in sizes not allowing entrance of fingers, and is fitted to the opened upper surface and the opened lower surface respectively of the airframe contour 6 to prevent fingers from touching the rotors 5. In order to reduce weight, the guard member is preferably formed of a resin material, but may be formed of a metal material to secure strength. Regardless of the material that forms the guard member, it is preferable that the holes or slits of the guard member are formed by arranging a plurality of extremely fine lines with intervals so as to prevent, as far as possible, the interruption of airflow generated by rotations of the rotors 5.

On the outer peripheral surface and the upper and lower edge surfaces of the airframe contour 6, a detector 110 that detects a user's touch operation is provided. Each detector 110 may be an electrostatic capacitance touch sensor or touch switch. When the user touches the outer peripheral surface or the upper or lower edge surface of the airframe contour 6, the detector 110 detects the user's touch operation. The detector 110 detects the touch position by the touch operation, and notifies the detection to the controller that is mounted on the housing 2. In order to enable the detector 110 to detect a touch operation when the user touches the airframe contour 6 in a state of wearing gloves, the detector 110 may be a pressure sensor such as a touch sensor.

Figure 2:
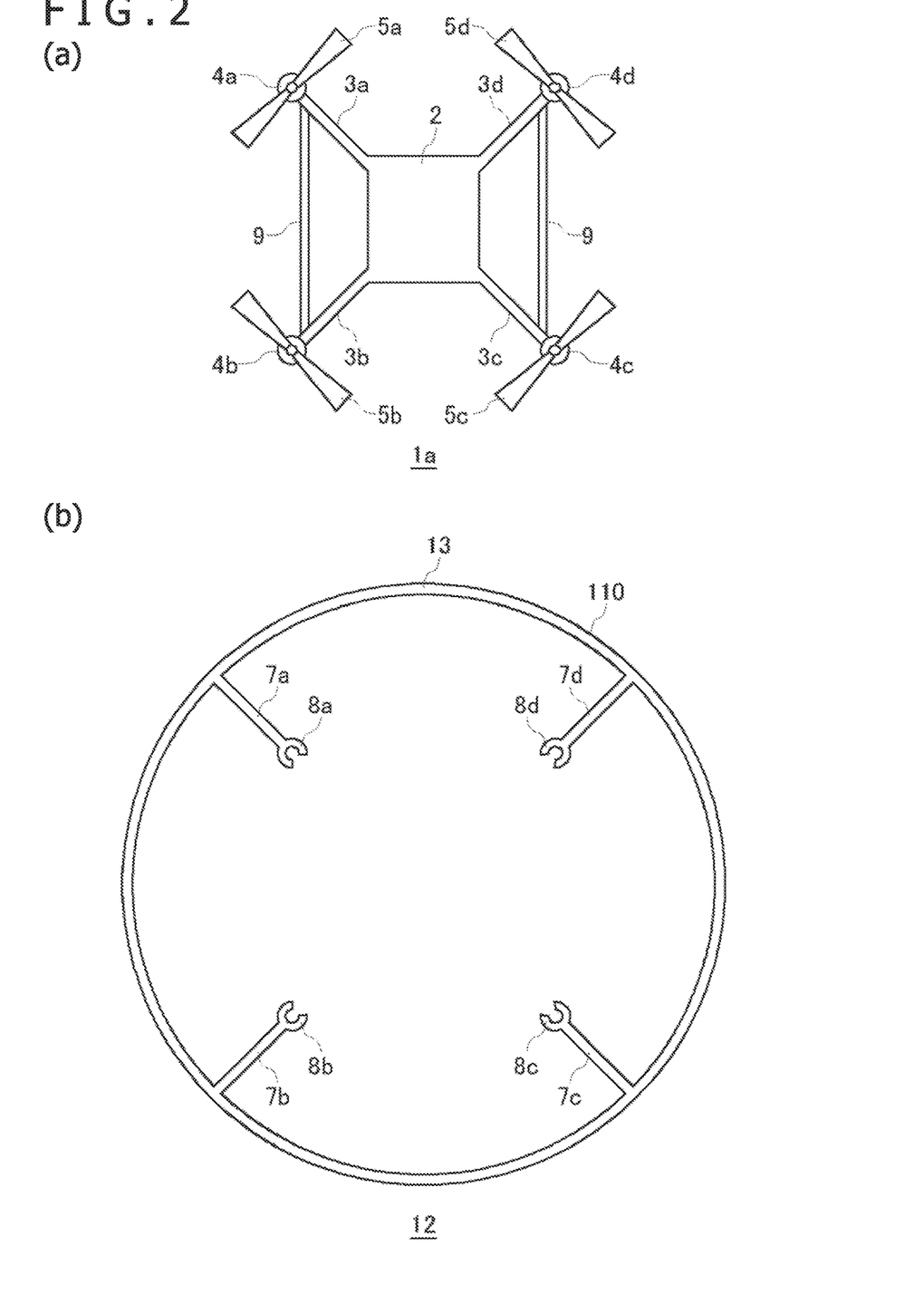
FIG. 2(a) is a view illustrating another example of an unmanned flying object.
FIG. 2(b) is a view illustrating a rotor protection part.

FIG. 2(a) illustrates another example of an unmanned flying object. An unmanned flying object 1a illustrated in FIG. 2(a) includes the housing 2 and four arms 3 that are provided to radially extend in a horizontal direction from the housing 2, in a similar manner to that of the unmanned flying object 1 illustrated in FIG. 1(a). In the unmanned flying object 1a, the motor 4 and the rotor 5 are provided on each arm 3, and each arm 3 has an end at a fitting position of the motor 4.

FIG. 2(b) illustrates an example of a rotor protection part 12 that is fitted to the unmanned flying object. The rotor protection part 12 is fitted to the unmanned flying object 1a so as to surround the housing 2. In the unmanned flying object 1a, the rotors 5 are positioned on the outermost periphery of the airframe. Therefore, when the unmanned flying object 1a which is in flight collides against an obstacle, the rotors 5 have a possibility of being broken due to the shock of collision. The rotor protection part 12 is a part for protecting the rotors 5 from the shock of the collision, and is manufactured as an accessory which is detachably attached to the unmanned flying object 1a.

The rotor protection part 12 includes a ring-shaped frame 13, and a fifth arm 7a, a sixth arm 7b, a seventh arm 7c, and an eighth arm 7d that are provided to radially extend inward from the inner peripheral surface of the ring-shaped frame 13. Hereinafter, when each arm is not distinguished, the arms will be also collectively referred to as "arms 7."

On an open end of the fifth arm 7a, a first fixed structure 8a to be fitted to the first arm 3a is formed. Similarly, on an open end of the sixth arm 7b, a second fixed structure 8b to be fitted to the second arm 3b is formed. On an open end of the seventh arm 7c, a third fixed structure 8c to be fitted to the third arm 3c is formed. On an open end of the eighth arm 7d, a fourth fixed structure 8d to be fitted to the fourth arm 3d is formed. Hereinafter, when each fixed structure is not distinguished, the fixed structures will be also collectively referred to as "fixed structures 8."

The rotor protection part 12 is fitted to the unmanned flying object 1a, by having the first fixed structure 8a, the second fixed structure 8b, the third fixed structure 8c, and the fourth fixed structure 8d, respectively fixed to the first arm 3a, the second arm 3b, the third arm 3c, and the fourth arm 3d of the unmanned flying object 1a. When the rotor protection part 12 is fitted to the unmanned flying object 1a, the ring-shaped frame 13 configures the airframe contour 6 illustrated in FIG. 1(a).

The ring-shaped frame 13 surrounds the housing 2 in the same manner as that of the airframe contour 6. The ring-shaped frame 13 is disposed on a radially outer side of the rotation region of the rotors 5, and has, in the side view, a height in which the rotors 5 are accommodated within the inner space of the ring-shaped frame 13. A state that the rotor protection part 12 including the ring-shaped frame 13 is fitted to the unmanned flying object 1a reduces a possibility that the hand touches the rotors 5, when the user touches the hovering airframe from the side. An opened upper surface and an opened lower surface of the ring-shaped frame 13 may be blocked with a guard member that does not interrupt the airflow generated by the rotors 5.

The outer peripheral surface and the upper and lower edge surfaces of the ring-shaped frame 13 are provided with the detector 110 that detects a user's touch operation. The arms 7, the fixed structures 8, and the arms 3 are formed with a transmission line for transmitting a result of detection by each of the detectors 110. Each detector 110 transmits the detection result, via the transmission line, to the controller accommodated in the housing 2 of the unmanned flying object 1a. Therefore, the unmanned flying object 1a that is fitted with the rotor protection part 12 has the same configuration as that of the unmanned flying object 1 illustrated in FIG. 1(a). Hereinafter, a user's airframe operation will be described based on the configuration of the unmanned flying object 1.

Figure 3:
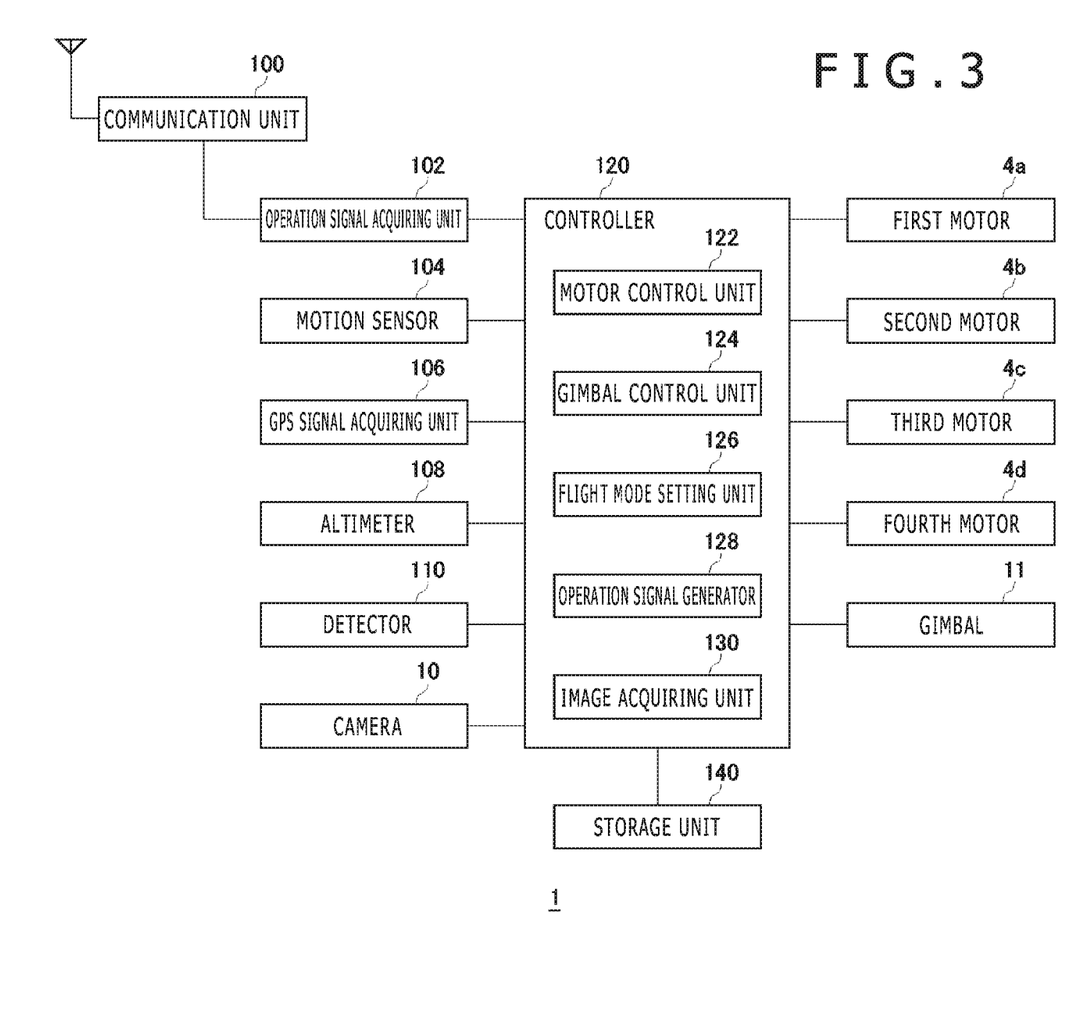
FIG. 3 is a diagram illustrating functional blocks of the unmanned flying object.

FIG. 3 illustrates a functional block diagram of the unmanned flying object 1. The unmanned flying object 1 includes a communication unit 100, an operation signal acquiring unit 102, a motion sensor 104, a GPS signal acquiring unit 106, an altimeter 108, the detectors 110, a controller 120, and a storage unit 140, in addition to the motors 4, the camera 10, and the gimbal 11. The controller 120 is mounted in the housing 2, and has a motor control unit 122, a gimbal control unit 124, a flight mode setting unit 126, an operation signal generator 128, and an image acquiring unit 130. The image acquiring unit 130 acquires image data captured with the camera 10, and causes the storage unit 140 to store the acquired image data. As described above, the detectors 110 are provided around the housing 2.

In FIG. 3, the elements of the controller 120 that are described as functional blocks for performing various processing can be configured by a central processing unit (CPU), memories, and other large-scale integrations (LSIs), as hardware, and can be realized by programs loaded on memories, as software. Therefore, those who are skilled in the art concerned can understand that these functional blocks can be realized in various forms, that is, by only hardware, by only software, or by combination of hardware and software. A realization method is not limited to any one of these methods.

The communication unit 100 receives an operation signal transmitted from the user's remote controller. The communication unit 100 may transmit the data captured by the camera 10, according to need, to a user's smartphone or to the image server that performs an image storage service. The operation signal acquiring unit 102 acquires the operation signal received by the communication unit 100. The operation signal transmitted from the remote controller includes flight instruction signals for instructing flight states, such as move forward/backward instruction signals, move upward/downward instruction signals, and a direction change instruction signal. Further, the operation signal includes camera control signals for instructing a setting of an angle of elevation (pitch) of the camera 10, and recording of data captured by the camera 10. The motor control unit 122 controls the rotations of the plurality of motors 4, based on a flight instruction signal acquired by the operation signal acquiring unit 102. Specifically, the motor control unit 122 determines a quantity of a current to be applied to each motor 4 according to a flight instruction signal, and supplies the current from a battery not illustrated.

The motion sensor 104 has a triaxial angular-velocity sensor and a triaxial acceleration sensor. The motor control unit 122 calculates a flight velocity and a direction of the airframe, from a result of detection by the motion sensor 104. The motor control unit 122 may further calculate a flight velocity and a direction of the airframe, by using a result of detection by a triaxial magnetic sensor. Because the unmanned flying object 1 that is in flight receives the influence of wind, the motor control unit 122 appropriately adjusts the application current quantity, based on a result of detection by each sensor so that the airframe becomes in a flight state according to the flight instruction signal.

Further, the motor control unit 122 controls the rotation of each motor 4 so as to stabilize a posture of the airframe, by calculating the posture of the airframe from a result of detection by the motion sensor 104. Similarly, the gimbal control unit 124 also controls the drive of the gimbal 11 so as to stabilize a posture of the camera 10, by calculating the posture of the airframe from a result of detection by the motion sensor 104. The motor control unit 122 may provide a calculated airframe posture to the gimbal control unit 124, and the gimbal control unit 124 may control the drive of the gimbal 11 based on the provided airframe posture.

The GPS signal acquiring unit 106 acquires a GPS signal, and the altimeter 108 measures the airframe height. The motor control unit 122 specifies the current airframe position, by acquiring a longitude and a latitude from the GPS signal, and by acquiring the airframe height from the altimeter 108.

The motor control unit 122 according to the embodiment has a hovering function of making the airframe automatically perform a stationary flight at a hovering position. The motor control unit 122 makes the airframe fly, based on the flight instruction signal. However, when the operation signal acquiring unit 102 stops acquiring the flight instruction signal, the motor control unit 122 sets the airframe position of this time, as the hovering position. That is, the motor control unit 122 sets, as the hovering position, the longitude, the latitude and the height at the time of stopping acquiring the flight instruction signal. The motor control unit 122 controls rotations of the motors 4 so as to make the airframe perform a stationary flight at the set hovering position. Thereafter, when the operation signal acquiring unit 102 acquires a flight instruction signal, the motor control unit 122 starts again the flight control based on the flight instruction signal.

The unmanned flying object 1 according to the embodiment has at least three flight modes. The flight mode setting unit 126 sets a flight mode, and notifies the set flight mode to the motor control unit 122.

A first flight mode is a mode of controlling the flight of the airframe with a flight instruction signal from the remote controller. In the first flight mode, when a flight instruction signal is not transmitted from the remote controller, the motor control unit 122 makes the airframe perform a stationary flight at the hovering position by the hovering function. When the power source of the unmanned flying object 1 is set on, the flight mode setting unit 126 sets the flight mode to the first flight mode.

A second flight mode is a mode in which the airframe autonomously flies to a determined target place. The target place may be set by inputting a longitude, a latitude, and height, for example. A representative target place is a longitude, a latitude, and height when the user has set on the power source of the unmanned flying object 1. An airframe position when the power source is set on is automatically registered as a home position in the storage unit 140. During the flight of the airframe in the first flight mode, when the user operates a predetermined button provided in the remote controller, the flight mode setting unit 126 sets the second flight mode as the flight mode, and the motor control unit 122 autonomously controls the rotations of the motors 4 so that the airframe returns to the home position.

A third flight mode is a mode in which the user performs flight control of the airframe by a physical airframe operation. In this case, the physical airframe operation means the operation that the user directly touches the airframe to move the airframe. When the user touches, with the hand, the airframe of the hovering unmanned flying object 1, the flight mode setting unit 126 sets the third flight mode as the flight mode. In the third flight mode, the hovering function is set off. After the user moves, with the hand, the airframe from the hovering position, the airframe is set not to return to the original hovering position.

Hereinafter, the operation mode in the third flight mode will be described. In the third flight mode, the motor control unit 122 controls the rotations of the motors 4, based on the user's touch operation detected by any one of the detectors 110.

<Operation Mode 1>

The user grasps, with the hand, the hovering unmanned flying object 1, and moves the unmanned flying object 1 to a desired position by keeping grasping.

Figure 4:
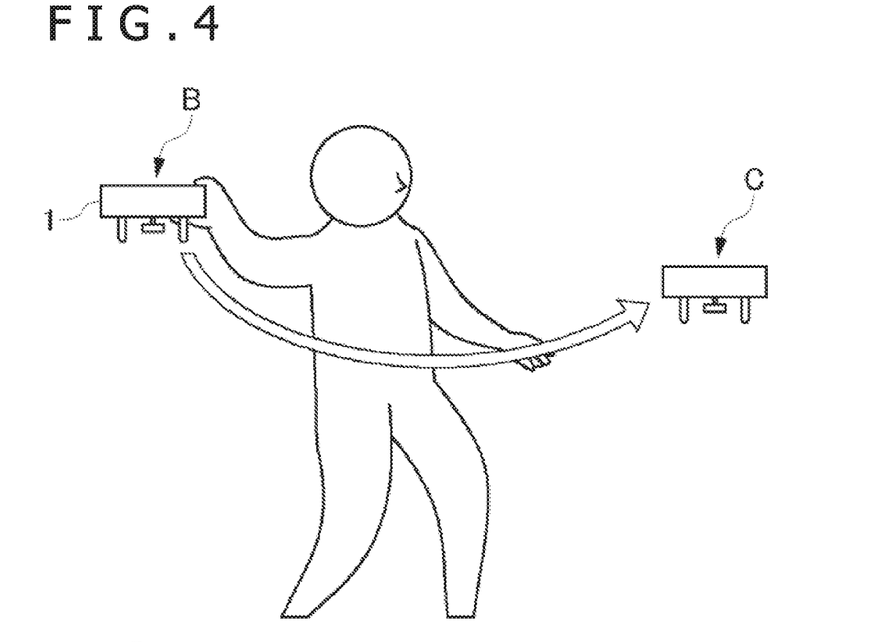
FIG. 4 is a view illustrating an operation mode of a third flight mode.

FIG. 4 illustrates an operation mode 1 in the third flight mode. The user gasps, with the hand, the unmanned flying object 1 hovering at a position B, and moves the unmanned flying object 1 to a position C. When the user releases the hand from the unmanned flying object 1, the unmanned flying object 1 hovers at the position C.

When the unmanned flying object 1 is hovering at a position B, the flight mode is in the first flight mode. When the user grasps the airframe contour 6 of the unmanned flying object 1, any one of the detectors 110 detects the user's touch operation, and notifies a detection result to the controller 120. The detector 110 may notify the touch position of the airframe contour 6, as a detection result.

When the user's touch operation is detected, the flight mode setting unit 126 changes the flight mode from the first flight mode to the third flight mode. The change of the flight mode is notified to the motor control unit 122. The motor control unit 122 sets the hovering function off, and stops the hovering control. The stop of the hovering control refers to stopping the autonomous flight at the hovering position by cancelling the hovering position set at the hovering start time, and does not refer to stopping the motor drive. Upon receiving the notification of a change of the flight mode, the motor control unit 122 stops the hovering control while maintaining the drive state of motor immediately before the change notification.

The motor control unit 122 keeps the setting of the hovering function off during a period while the detectors 110 are detecting the user's touch operation. When the detectors 110 stop detecting the user's touch operation, the motor control unit 122 sets the hovering function on. The on/off of the hovering function is determined by the flight mode which is set by the flight mode setting unit 126. That is, during a period while the detectors 110 are detecting the user's touch operation, the flight mode setting unit 126 keeps the setting of the third flight mode, as the flight mode. Therefore, the motor control unit 122 keeps the setting of the hovering function off. On the other hand, when the detectors 110 stop detecting the user's touch operation, the flight mode setting unit 126 sets the flight mode to the first flight mode. Upon receiving the setting notification of the first flight mode, the motor control unit 122 sets the hovering function on, and makes the airframe perform a hovering flight when not receiving the flight instruction signal from the remote controller.

According to the operation mode example illustrated in FIG. 4, at the point of time when the user grasps, with the hand, the airframe of the unmanned flying object 1 which is hovering at the position B, the motor control unit 122 sets the hovering function off. Then, the user moves the airframe to the position C in the state that the user keeps grasping the airframe. During this period, the motor control unit 122 maintains the off of the hovering function. Thereafter, when the user releases the hand from the airframe at the position C, the motor control unit 122 sets the hovering function on again, and controls the airframe to perform the stationary flight at the position C by using the position C as the hovering position.

The operation mode 1 is utilized when the user wants to perform a fine positional adjustment of the unmanned flying object 1. Based on the airframe operation with the remote controller, it is difficult to move the airframe as required, because the airframe makes a larger movement than required when the user wants to slightly move the hovering position, or because the airframe has made a large directional change when the user wants to slightly change the direction for the purpose of photographing. In this case, a simple airframe operation can be realized, by moving the airframe by directly touching the unmanned flying object 1 as in the operation mode 1.

<Operation Mode 2>

The user moves the unmanned flying object 1 to a desired direction, by pushing the hovering unmanned flying object 1 with the hand.

Figure 5:
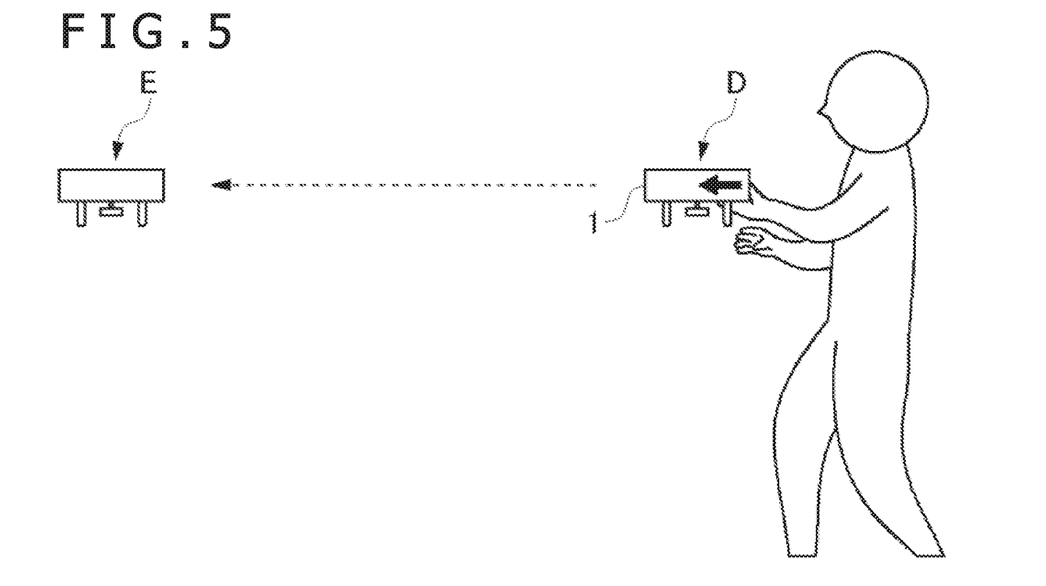
FIG. 5 is a view illustrating an operation mode of the third flight mode.

FIG. 5 illustrates an operation mode 2 in the third flight mode. When the user pushes forward, with the hand, the unmanned flying object 1 which is hovering at a position D, the unmanned flying object 1 moves by a distance in accordance with the push-out force, and hovers at a position E.

When the unmanned flying object 1 is hovering at the position D, the flight mode is in the first flight mode. When the user touches, with the hand, the airframe contour 6 of the unmanned flying object 1, one of the detectors 110 detects the user's touch operation, and notifies a detection result to the controller 120. The detector 110 may notify the touch position of the airframe contour 6, as a detection result.

When the user's touch operation is detected, the flight mode setting unit 126 changes the flight mode from the first flight mode to the third flight mode. The change of the flight mode is notified to the motor control unit 122. The motor control unit 122 sets the hovering function off, and stops the hovering control.

As described above, the motor control unit 122 keeps the setting of the hovering function off during a period while the detectors 110 are detecting the user's touch operation. When the detectors 110 stop detecting the user's touch operation, the motor control unit 122 sets the hovering function on. In the operation mode example illustrated in FIG. 5, when the user touches the airframe contour 6 with the hand at a position D, the motor control unit 122 sets the hovering function off. When the user pushes out the airframe contour 6 with the hand to a desired direction and the airframe is released from the hand, the motor control unit 122 sets the hovering function on again.

In the third flight mode, the operation signal generator 128 generates an operation signal in accordance with the user's touch operation. Specifically, the operation signal generator 128 generates a flight instruction signal in accordance with external force applied to the airframe by the user. The generated flight instruction signal is supplied to the motor control unit 122. The motor control unit 122 controls rotations of the motors 4, based on the generated flight instruction signal.

During the performance of the third flight mode, the operation signal generator 128 calculates a velocity and a direction of the airframe pushed out by the user, from a result of detection by the motion sensor 104. The calculated velocity and direction depend on the external force applied to the airframe by the user. When the external force is large, the airframe velocity is calculated to be large, and when the external force is small, the airframe velocity is calculated to be small. The operation signal generator 128 calculates the velocity and the direction of the airframe during a predetermined period (for example, 0.1 seconds) immediately before the hand is released from the airframe contour 6. The operation signal generator 128 generates a flight instruction signal for making the airframe fly to a calculated direction by the distance according to the airframe velocity. The flight instruction signal may be for making the airframe stationary at a position E by gradually reducing the airframe velocity from a maximum velocity at the moment when the hand is released. Alternatively, the flight instruction signal may be for making the airframe fly to the position E without reducing the airframe velocity of the moment when the hand is released. The operation signal generator 128 supplies a flight instruction signal to the motor control unit 122 during a flight period of the airframe from the position D to the position E. When the airframe reaches the position E, the operation signal generator 128 stops supplying the flight instruction signal. Therefore, the motor control unit 122 controls the airframe to perform the stationary flight at the position E by using the position E as the hovering position.

The operation mode 2 is utilized when the user wants to move the unmanned flying object 1 to a desired position. Because the user moves the unmanned flying object 1 to a desired direction in the feeling of throwing a ball, for example, the user can intuitively realize an airframe operation.

According to the operation mode 2, it is possible to construct a game which enables a plurality of users to compete against each other for accurately moving the unmanned flying object 1 to a target point in the air. The height of the target point may be different from the height of an initial position, and it is possible to provide a game feeling such as beanbag toss, for example. Further, by setting the heights of a plurality of the unmanned flying objects 1 equal, it is also possible to construct a game such as curling in the air.

In the third flight mode, because the user operates the unmanned flying object 1 by touching with the hand, it is preferable that the motor control unit 122 controls the height of the airframe to an upper limit height or less at which the user can touch the unmanned flying object 1 with the hand. Further, when the height of the unmanned flying object 1 is too low, the user cannot easily operate the unmanned flying object 1 by touching with the hand. Therefore, it is preferable that the motor control unit 122 controls the height of the airframe to a lower limit height or above. When the motor control unit 122 limits the height of the airframe to within a predetermined range in this way, the user can enjoy the third flight mode. The lower limit height may be set to 1 m, and the upper limit height may be set to 1.5 m by default, and the user may be able to freely change these heights.

In the case where the upper limit height is not set or the height is set in a height at which the hand cannot reach the unmanned flying object 1, when the user pushes out the airframe upward, the unmanned flying object 1 may move to a position at which the hand cannot reach the unmanned flying object 1 and may hover there. Therefore, in the remote controller, there may be provided a fall button for transmitting a flight instruction of making the hovering unmanned flying object 1 fall to a predetermined height (for example, 1.2 m). When the user operates the fall button in the third flight mode, the operation signal acquiring unit 102 acquires a fall instruction signal for making the unmanned flying object 1 fall to a predetermined height. The motor control unit 122 controls the rotations of the motors 4 so that the unmanned flying object 1 falls to the predetermined height. As a result, the user can touch the airframe with the hand.

The unmanned flying object 1 may have a function of acquiring a voice of the user as a flight instruction signal by having a microphone. In the third flight mode, the unmanned flying object 1 can acquire the voice of the user from the microphone because the unmanned flying object 1 is positioned near the user. In the storage unit 140, when a predetermined voice word is registered in advance as a command of the flight instruction and the unmanned flying object 1 analyzes the voice input from the microphone, the motor control unit 122 can perform motor control based on the voice instruction. For example, it may be arranged such that after the user pushes forward the unmanned flying object 1 with the hand, the user issues a voice word (for example, "stop") for instructing a forcible stationary flight, and the unmanned flying object 1 analyzes the voice. As a result, the motor control unit 122 may perform the motor control so that the unmanned flying object 1 performs a stationary flight.

The present invention has been described based on the embodiment. Those who are skilled in the art concerned may understand that the embodiment is an exemplification, that it is possible to prepare various modifications in the combination of these configuration elements and processing processes, and that these modifications are also within the range of the present invention.

In the present embodiment, the operation signal generator 128 generates a flight instruction signal according to the calculated velocity and direction of the airframe. Alternatively, the flight instruction signal may be generated based on a touch position detected by the detector 110. For example, the operation signal generator 128 may generate an instruction signal for making the airframe fly by a predetermined distance, by determining a moving direction of the airframe from a touch position detected by any one of the detectors 110.

REFERENCE SIGNS LIST

1 . . . Unmanned flying object
2 . . . Housing
3 . . . Arm
4 . . . Motor
5 . . . Rotor
6 . . . Airframe contour
7 . . . Arm
8 . . . Fixed structure
9 . . . Leg
10 . . . Camera
11 . . . Gimbal 12 . . . Rotor protection part
13 . . . Ring-shaped frame
100 . . . Communication unit
102 . . . Operation signal acquiring unit
104 . . . Motion sensor
106 . . . GPS signal acquiring unit
108 . . . Altimeter
110 . . . Detector
120 . . . Controller
122 . . . Motor control unit
124 . . . Gimbal control unit
126 . . . Flight mode setting unit
128 . . . Operation signal generator
130 . . . Image acquiring unit
140 . . . Storage unit

INDUSTRIAL APPLICABILITY

The present invention can be utilized in the technical field of the unmanned flying object.

The invention claimed is:

1. An unmanned flying object that has a plurality of rotors, the unmanned flying object comprising:
   electric motors configured to drive the rotors;
   an operation signal acquiring unit configured to acquire an operation signal;
   a controller configured to control rotations of the electric motors, based on the operation signal acquired by the operation signal acquiring unit; and
   detectors configured to detect a user's touch operation to an airframe, wherein:
   the controller controls rotations of the electric motors, based on the user's touch operation detected by an one of the detectors,
   the controller has a hovering function of making the airframe automatically perform a stationary flight at a hovering position via maintaining drive rotational speeds of electric motors necessary for hovering at the hovering position, and
   when any one of the detectors detects a user's touch operation, the controller sets the hovering function off, while maintaining the drive rotational speeds of electric motors existing immediately prior to the user's touch operation.

2. The unmanned flying object according to claim 1, wherein the detectors are provided around a housing on which the controller is mounted.

3. The unmanned flying object according to claim 2, wherein the detectors are provided on a ring-shaped frame that surrounds the housing.

4. The unmanned flying object according to claim 1, wherein the controller keeps the setting of the hovering function off during a period while the detectors are detecting a user's touch operation, and when the detectors stop detecting a user's touch operation, the controller sets the hovering function on.

5. The unmanned flying object according to claim 1, further comprising:
   an operation signal generator configured to generate an operation signal in accordance with a user's touch operation, wherein
   the controller controls rotations of the electric motors in accordance with an operation signal generated by the operation signal generator.

6. The unmanned flying object according to claim 5, wherein the operation signal generator generates an operation signal in accordance with external force applied to the airframe by the user.

7. The unmanned flying object according to claim 1, wherein the controller limits a height of the airframe to a height at which the user touches the airframe with a hand or to a lower height.

8. A method of controlling a flight of an unmanned flying object that has a plurality of rotors, the method comprising:
   acquiring an operation signal;
   controlling rotations of electric motors that drive rotors, based on an acquired operation signal; and
   detecting a user's touch operation to an airframe, wherein:
   the controlling the rotations of the electric motors includes controlling the rotations of the electric motors, based on the detected user's touch operation,
   the controlling includes a hovering function of making the airframe automatically perform a stationary flight at a hovering position via maintaining drive rotational speeds of electric motors necessary for hovering at the hovering position, and
   when any one of the detectors detects a user's touch operation, the controlling includes setting the hovering function off, while maintaining the drive rotational speeds of electric motors existing immediately prior to the user's touch operation.

9. A non-transitory, computer readable storage medium containing a computer program, which when executed by a computer, which is installed in an unmanned flying object having a plurality of rotors, causes the computer to carry out actions, comprising:
   acquiring an operation signal,
   controlling rotations of electric motors that drive rotors based on the acquired operation signal, and
   detecting a user's touch operation to an airframe, wherein:
   the controlling rotations of electric motors includes controlling rotations of motors, based on a detected user's touch operation,
   the controlling includes a hovering function of making the airframe automatically perform a stationary flight at a hovering position via maintaining drive rotational speeds of electric motors necessary for hovering at the hovering position, and
   when any one of the detectors detects a user's touch operation, the controlling includes setting the hovering function off, while maintaining the drive rotational speeds of electric motors existing immediately prior to the user's touch operation.

* * * * *